T. P. LITTLE.
PROCESS AND APPARATUS FOR THE TREATMENT OF PLASTIC SUBSTANCES.
APPLICATION FILED MAY 27, 1918.
1,297,482.
Patented Mar. 18, 1919.
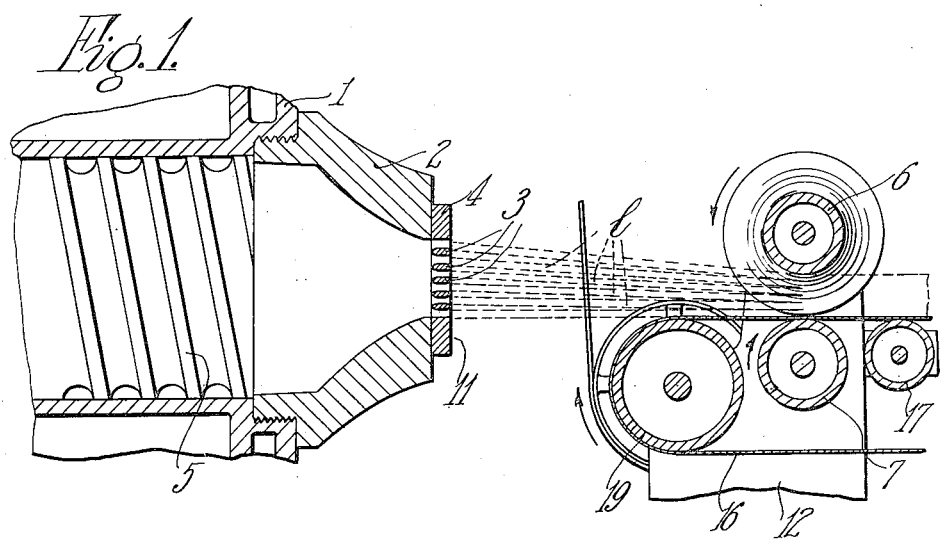
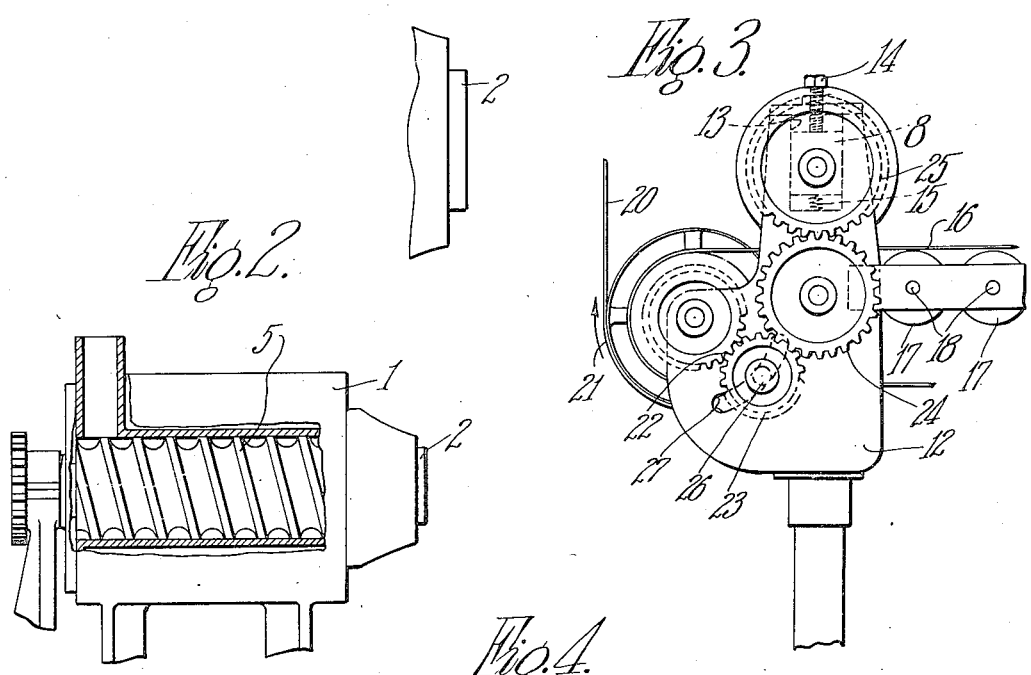
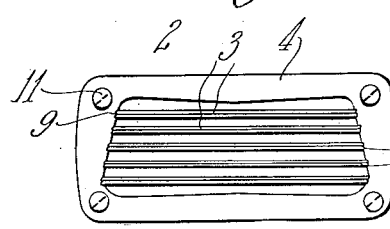
INVENTOR.
Thomas P. Little
BY Chapin + Neal
ATTORNEYS.

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

PROCESS AND APPARATUS FOR THE TREATMENT OF PLASTIC SUBSTANCES.

1,297,482.  Specification of Letters Patent.  Patented Mar. 18, 1919.

Application filed May 27, 1918. Serial No. 236,814.

*To all whom it may concern:*

Be it known that I, THOMAS P. LITTLE, a citizen of the United States of America, residing at Chicopee Falls, in the county of Hampden and State of Massachusetts, have invented certain new and useful Improvements in Processes and Apparatus for the Treatment of Plastic Substances, of which the following is a specification.

My invention relates to processes and apparatus for the treatment of plastic substances and, while not restricted thereto, has more particular relation to processes and apparatus for the treatment of rubber.

Heretofore, it has been proposed to remove entrapped fluids from plastic rubber in process of manufacture by bringing the rubber into contact with small suction orifices to thereby remove the fluids; and it has also been proposed to merely rearrange the entrapped fluids in the rubber so that, in the case of tires, the fluids will lie circumferentially of the tires. The first process referred to is open to obvious objections. In the second process referred to, the laminations into which the material had been separated were immediately brought together again before leaving the container and under so great a surrounding pressure, substantially the same as that of the fluids themselves, that the fluids could not force themselves to the surface of the laminations and so escape; or, if the gases did escape, the pockets merely became filled again and with fluids in the container. I have devised a process, and an apparatus for practising the same, whereby the entrapped fluids, more particularly, of course, gases, are, simply and quickly, practically wholly removed from the material under treatment.

It is usual to make laminated tires by winding many layers of rubber upon the circumference of a wheel and then cutting to proper lengths and trimming the edges. Were it not for the slowness of this method, and the loss of rubber and labor due to trimming the edges, this process would be, in many respects, ideal, because of the fine control that can be exercised over the pressure with which the various layers are pressed or laid one against the other. The process I have devised has the advantage of accurate regulation of the pressure used in placing the laminations together present in the old method but is, because of the elimination of trimming, less expensive and is capable of being practised with greater speed than was possible with the old method.

One object of my invention is to provide a process for the treatment of plastic materials, whereby the entrapped fluids are quickly and effectively removed.

Another object is to provide a process for the fast and inexpensive production of laminated material for use in building rubber tires, for example.

Another object is to provide an apparatus for treating plastic materials to remove the entrapped fluids quickly and effectively.

Another object is to provide an apparatus for producing laminated bodies, such as rubber tire stock, quickly and inexpensively.

To these ends, and also to improve generally upon processes and apparatus of the character indicated, my invention consists in the following matters hereinafter described and claimed.

In the accompanying drawings—

Figure 1 is a somewhat conventional, longitudinal, cross-sectional view of an apparatus embodying my invention and for practising my process, certain parts being broken away to economize space;

Fig. 2 is a longitudinal cross-sectional view of the stock container of the apparatus illustrated in Fig. 1 but on a smaller scale;

Fig. 3 is a side elevation of the squeeze rollers and their mounting, of the apparatus illustrated in Fig. 1; and Fig. 4 is a front elevation of the laminating die illustrated in Fig. 1, but to an enlarged scale.

The illustrated apparatus comprises a container 1 for the plastic rubber stock to be operated upon and having mounted at the outlet thereof a laminating die designated generally as 2. The die 2 comprises a series of bars 3 carried in a block 4 exterior of the die head and of the container 1. A screw conveyer 5 within the container exerts pressure upon the material to force the material through the die.

A pair of squeeze rollers 6 and 7 is arranged at a distance from the die and separated therefrom by a region of lower pressure than will, during operation, exist in the container and die. This region of lower pressure may conveniently be merely the room in which the apparatus is set up and in which the pressure is normally substantially atmospheric. One of the rollers has both its journals mounted each in an adjustable journal box, as 8, whereby the pressure which the rollers exert can be regulated at will and utterly independently of the pressure which it may be desirable to use in the container and, so, at the die.

It will be understood, of course, that the laminating die, squeezing rollers, and so forth, illustrated, and referred to above, are illustrative merely of suitable means for laminating the material, for bringing the laminations together, and so forth.

In practising my process, in the preferable manner and with the described and illustrated apparatus, the rubber stock is forced through the die and thereby separated and laminated and, while the laminations 1 1 are separated, passes into and through the region (as the room) in which the pressure is lower than that in the container. Because this region does have a lower pressure than exists in the container and at the die, the gases, entrapped in the laminations and, of course, at the pressure existing in the container, burst their way through the laminations and escape. The fact that the stock is laminated will in itself free the gas held in pockets which are opened by the separation of the stock into the layers or laminations. Thus, the material is effectively freed of the entrapped gases.

The laminations, while still in separated condition, are passed forward to the squeezing rolls and are there squeezed together, the distance between the die and the rolls being made sufficient to give full opportunity for the fluids to escape. When the laminations pass between the rolls and are squeezed together any gas pockets yet remaining are mechanically broken down and the gas freed. The rolls are extremely efficient for this breaking down action as they present, of course, two surfaces converging toward the laminations in the direction of travel of the laminations. So, as the laminations pass between these surfaces and the exerted pressure increases, the forward end of each pocket has its walls pressed together, and the imprisoned gas is forced to the rear end of the pocket, where the pressure becomes so great that the pocket bursts. The continued action of the rolls flattens out any hollows or "half pockets" that may be left after the pockets burst, and the stock leaves the rolls free of pockets, portions of pockets, or entrapped fluids. This action at the rolls is, of course, aided by the fact that the rolls are in the region of low pressure and so, the pressure counter to the pressure brought about by the rolls, is small.

It will be seen that the pressure exerted by the rollers is utterly independent, as regards regulation, of that existing in the container. So, the most desirable pressure for treatment in the container and at the die can be used at those points while at the same time the most desirable pressure for bringing the laminations together can be used at the rolls. This is of very material importance, as in previous devices, in which the laminating means is inside the container and the laminations are brought together at the outlet of the container as they pass therethrough, the pressure at the outlet, which squeezes the laminations together, is dependent on the pressure in the container, and that pressure is necessary to force the material through the die. The difficulty with any such arrangement is, of course, that, the squeezing pressure being dependent on the pressure in the container, both pressures can not always be brought to the most desirable amount at one and the same time.

It will be seen, too, that, since the laminations can be squeezed together with just the desired pressure, laminated tire stock can be made under a squeezing pressure control equal to that possible in the old method in which the material was wound onto the circumference of a wheel. And in addition, since the laminations come to the squeezing means in a series of overlying elements, and, since the laminations can be given an exact width by the die, tires can be manufactured with less waste and with greater speed than was possible with the wheel method.

With regard to the details of the apparatus illustrated, the bars 3 are preferably somewhat "stream-line" in section crosswise of their lengths, to thereby offer a minimum resistance to the passage of the material and conveniently are integral with the block 4 at their ends 9 and 10, but may be attached to the block in any other suitable manner. The block is attached to the face of the die body by screws 11. As shown more particularly in Fig. 4, the die opening is of a configuration to give the issuing stock the cross-sectional shape desired for the solid tire, and, as indicated in Fig. 1, the roller 6 has large end flanges also conforming in shape to the desired tire form. Thus, trimming of the edges of the tire is eliminated.

The squeeze rollers 6 and 7 are carried in a suitable machine frame 12, and the sliding journal boxes, as 8, for the roller 6 slide in ways, as 13, provided by the frame. By its adjusting screw 14, each journal box 8 can be set in the desired relation to give the roller 6 proper pressure upon the material, and each box has thereunder a spring 15 to hold the box against the adjusting screw.

The material is carried to, between, and beyond the rollers by a conveying belt 16 carried on idlers 17, 17 carried by the frame 12, as indicated at 18, 18. This belt is driven by the pulley or roller 19 carried in the frame 12 and driven by the power belt 20, which drives the pulley 21 fast connected with the roller 19 for driving the same.

Conveniently the rollers 6 and 7 are driven from the belt 20, and to this end the roller 19 carries, to turn therewith and be driven thereby, a gear 22 which, by means of an idler 23, drives the driving gear 24 fast connected with the roller 7 to drive the same. The gear 24, in turn, meshes with the driving gear 25 fast connected with the roller 6 to drive the roller. In order to vary the relative speeds of the rollers 6 and 7, it is desirable that different sized gears 24 be used. To this end, the carrying stud 26 of the idler 23 is carried in the slot 27 in any well known or other suitable manner to be shifted therealong and fixed in any desired position therein to place the idler in mesh with both the gears 22 and 24.

It will be seen that I have provided a simple and inexpensive process and suitable apparatus for practising the same which accomplish the objects of my invention.

Having thus described my invention, what I claim as new and desire to secure by Letters Patent, is—

1. In the art of making laminated bodies from a mass of plastic material, the method which consists in subjecting the mass to pressure whereby the fluids contained in pockets therein are compressed sufficiently to break their way through the layers of material formed thereafter, when said layers are subjected to a lower external pressure, dividing and separating the said mass into a plurality of layers while the fluid pressure previously created in the mass is still present, maintaining the separation thus brought about and at the same time passing the said plurality of layers into a region of pressure lower than the previously-created fluid pressure to permit the fluid in pockets in the layers to escape by virtue of the previously created pressure, and then pressing the layers together to form the laminated body and with a pressure independent of said previously created fluid pressure; substantially as described.

2. In the art of making laminated bodies from a mass of plastic material, the method which consists in placing the mass in an outletted receptacle having a die at its outlet designed to divide the mass into a plurality of layers, applying pressure to the mass in the container, whereby the fluids contained in pockets in the mass are compressed sufficiently to break their way through the layers formed thereafter, when said layers are subjected to a lower external pressure, forcing the mass through said die by said applied pressure to thereby divide and separate the mass into a plurality of layers while maintaining the fluid pressure previously created, maintaining the separation thus brought about and at the same time passing the layers into a region of pressure lower than the previously created fluid pressure to permit the fluid in pockets in the layers to escape by virtue of the previously created fluid pressure, and then pressing the layers together to form the laminated body and with a pressure independent of said previously created fluid pressure; substantially as described.

3. In an apparatus of the character indicated, in combination, an outletted receptacle for the plastic material to be operated upon and from which the material is forced under pressure, a laminating means at the outlet of said receptacle for laminating the material upon passage under the action thereof, and means exterior of said receptacle for squeezing the laminations together, said receptacle and said last-named means being adapted to be set up in operative relationship in a region of pressure lower than that existing in said receptacle, and to be arranged for the passage of the material therebetween through said region of lower pressure, substantially as described.

4. In an apparatus of the character indicated, in combination, an outletted receptacle for the plastic material to be operated upon and from which the material is forced under pressure, a laminating means at the outlet of said receptacle for laminating the material upon passage under the action thereof, and means exterior of said receptacle for squeezing the laminations together while in communication with said region of lower pressure, said receptacle and said last-named means being adapted to be set up in operative relationship in a region of pressure lower than that existing in said receptacle, and to be arranged for the passage of the material therebetween through said region of lower pressure, substantially as described.

5. In an apparatus of the character indicated, in combination, an outletted receptacle for the material to be operated upon, a laminating and separating means at the outlet of said receptacle, and means exterior to said receptacle and in proximity to said first-named means for receiving the material and squeezing the laminations thereof together, there being a material distance between said laminating and separating means and said squeezing means, whereby said material, while laminated and separated, must pass across a material distance exterior to the receptacle before reaching said squeezing means, substantially as described.

6. In an apparatus of the character indicated, in combination, an outletted container for the material to be operated upon, a laminating and separating means arranged at the outlet of said container and squeezing rolls exterior of said container for squeezing the laminations together, substantially as described.

7. In an apparatus of the character indicated, in combination, an outletted container for the material to be operated upon, a laminating and separating means arranged at the outlet of said container, and means exterior of said container for squeezing the laminations together, substantially as described.

THOMAS P. LITTLE.